United States Patent
Colas et al.

(10) Patent No.: US 6,397,243 B1
(45) Date of Patent: May 28, 2002

(54) METHOD AND DEVICE FOR PROCESSING SEVERAL TECHNICAL APPLICATIONS EACH PROVIDED WITH ITS PARTICULAR SECURITY

(75) Inventors: Gérard Colas, Versailles; Philippe Guedou, Rambouillet; Olivier Le Borgne, Montigny le Bretonneux; Jean-Jacques Rowenczyn, Ris-Orangis, all of (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/355,323
(22) PCT Filed: Jan. 30, 1998
(86) PCT No.: PCT/FR98/00174
§ 371 (c)(1),
(2), (4) Date: Aug. 2, 1999
(87) PCT Pub. No.: WO98/34171
PCT Pub. Date: Aug. 6, 1998

(30) Foreign Application Priority Data

Jan. 31, 1997 (FR) .......................................... 97 01073

(51) Int. Cl.$^7$ ................................................. G06F 9/00
(52) U.S. Cl. .......................... 709/100; 710/47; 710/48; 710/52; 712/35; 712/36
(58) Field of Search ................................ 709/100, 101, 709/102, 103, 104, 105, 106, 107; 710/47, 48, 52; 712/35, 36

(56) References Cited

U.S. PATENT DOCUMENTS

| 4,138,726 | A |   | 2/1979 | Girault et al. |          |
|-----------|---|---|--------|----------------|----------|
| 4,275,440 | A | * | 6/1981 | Adams, Jr. et al. | 710/48 |
| 4,642,756 | A | * | 2/1987 | Sherrod | 709/103 |
| 4,700,185 | A | * | 10/1987 | Balph et al. | 370/451 |
| 5,465,335 | A | * | 11/1995 | Anderson | 709/107 |
| 5,982,779 | A | * | 11/1999 | Krishnakumar et al. | 370/447 |
| 6,085,215 | A | * | 7/2000 | Ramakrishnan et al. | 709/102 |
| 6,055,619 | A1 | * | 4/2001 | North et al. | 712/36 |

OTHER PUBLICATIONS

"Dynamic Scheduling of Hard Real–Time Tasks and Real-Time Threads", Karsten Schwan and Hongyi Zhou, 1992, IEEE.*

"Priority Inheritance Protocols: An Approach to Real-Time Synchronization", Lui Shi, Ragunathan Rajkumar and John P. Lehoczky, 1990 IEEE.*

"Scheduling Techniques for Real-Time Application Consisting of Periodic Task Sets", Hardeep Singh, Texas Instrument, 1994 IEEE.*

"Scheduling Algorithm and Operating Systems Support for Real-Time Systems", Krithi Ramamaritham, and John A. Stankovic, 1994 IEEE.*

\* cited by examiner

Primary Examiner—Majid A. Banankhah
(74) Attorney, Agent, or Firm—Oblon, Spivak, McClelland, Maier & Neustadt, P.C.

(57) ABSTRACT

Method of processing several computer-controlled technical applications. The applications are executed within the same computer working in successive work cycles by allotting thereto during the work cycles at least one time slot of a previously fixed duration. At the end of the time slot allotted to a technical application, a start interrupt is generated which is aimed at starting the execution of another technical application. Each technical application has allotted thereto at least one memory space slot for writing data. The memory space slot is write-inaccessible to the other technical applications so that a technical application which during execution possesses a given level of criticality does not disturb another application having a higher or equal level of criticality.

20 Claims, 7 Drawing Sheets

| WRITE AREA | HARDWARE DEVICE | LB(Pi) | Pi LEVEL A | Pi LEVEL B | Pi LEVEL C | Pi LEVEL D | Pj i ≠ d |
|---|---|---|---|---|---|---|---|
| DMA I/O | W | W | | | | | |
| LB(Pi) | | W | | | | | |
| Pi LEVEL A | | W | W | | | | |
| Pi LEVEL B | | W | W | W | | | |
| Pi LEVEL C | | W | W | W | W | | |
| Pi LEVEL D | | W | W | W | W | W | |
| ALL | W | W | W | W | W | W | W |

METHOD AND DEVICE FOR PROCESSING SEVERAL TECHNICAL APPLICATIONS EACH PROVIDED WITH ITS PARTICULAR SECURITY

BACKGROUND OF THE INVENTION

1. Field of the Invention

The present invention relates to a method and a device for processing several computer-controlled technical applications, each of them executing with the safety appropriate thereto.

2. Discussion of the Background

This method can be used in particular in a flight management system (known by the initials FMS) for aircraft which talks to the pilot and which assists him in a certain number of operations. At present, the applications such as the automatic pilot, the ground proximity detection system, the system for protecting against stalling, the system for concentrating the flight parameters for the flight recorder or "black box", the system for concentrating data for maintenance, the system for analysing faults, the system for displaying flight parameters intended for the pilot etc. each executes simultaneously in a different computer. These various applications therefore do not interfere with one another since they are executed independently of each other.

These technical applications do not require the same safety of operation. A scale with several levels of criticality A, B, C, D etc. is defined so as to grade the safety required for a technical application. These levels of criticality reflect the maximum residual rate of appearance of faults graded as "critical". Level A is higher than level D.

It is readily appreciated that the automatic pilot or the system for displaying parameters for the pilot require a higher level of criticality than that of the maintenance application which is not critical.

In general, work time, memory space and data to be sent to entities which are associated with the application are needed in order to process a technical application in a computer.

The processing in a computer of a technical application demanding a high level of criticality will be carried out with many more steps of tests and checks than that of a technical application whose level is lower.

The development of a technical application possessing a low level of criticality is less expensive than that of a technical application possessing a higher level.

So as not to needlessly increase the cost of development of a technical application and also possibly the processing time and the memory store, it is therefore expedient to develop all these technical applications with the level(s) of criticality appropriate thereto. At present, since each of them is controlled by its own computer, no problem of safety arises between the technical applications.

With the considerable development in speed and capacity of microprocessors, the computers equipped with such microprocessors would be capable of supporting several of these technical applications. Such a grouping, of the order of eight applications, would allow a very substantial reduction in costs.

However, an important problem arises. The execution of one of the technical applications having one or more levels of criticality must not disturb the execution, in the same computer, of another application of higher or equal level. It is not acceptable to increase the rate of appearance of critical faults of a technical application on account of its closeness, in the same computer, with another less critical technical application.

The term disturbance should be understood to mean either a modification of the data in write mode or routed to the entities associated with the other application, or a modification of the time allotted to processing of another application.

SUMMARY OF THE INVENTION

The present invention aims to solve this problem by proposing a method for processing several technical applications on the same computer while avoiding any interaction between one application and another.

More precisely, the processing method executes all the technical applications within the same computer working in successive work cycles by allotting thereto, during these work cycles, at least one time slot of previously fixed duration and, generates at the end of time slot allotted to a technical application a start interrupt aimed at starting the execution of another technical application, allots to each technical application at least one memory space slot for writing data, this memory space slot being write-inaccessible to the other technical applications so that a technical application which, during execution, possesses a given level of criticality does not disturb another technical application having a higher or equal level of criticality.

During the processing of a technical application it may be necessary to execute one or more steps dubbed "atomic sections" which cannot be interrupted. During a time slot, the method can generate an end interrupt intended to interrupt the current application unless an atomic section is currently executing, the time interval between an end interrupt and the following start interrupt being at least equal to the duration of the longest atomic section.

To carry out the spatial slicing, the method allocates entitlements to the current technical application and, before writing data relating to the said technical application into a memory space slot, checks whether this memory space slot corresponds to the entitlements possessed by the current technical application, the entitlements of the said technical application being in particular dependent on its level of criticality.

The method according to the invention can also be applied to the data intended for entities associated with the various applications. To do this, the method, after having written the said data to a memory space slot, having previously performed the above check, sends them via a communication bus to the associated entity, possibly causing them to travel through a buffer memory area.

In order to guarantee the non-interaction of one technical application with another, the method according to the invention can generate a write-violation interrupt, with prohibition of writing, when a technical application write-accesses a memory space slot in respect of which it is without entitlements.

Write-protection can be envisaged; to do this, before reading data relating to the technical application being currently executed from a memory space slot, the method can check whether this memory space slot corresponds to the entitlements possessed by the technical application currently being executed. It can generate a read-violation interrupt when a technical application read-accesses a memory space slot in respect of which it is without entitlements. This read-safety is an additional means of detecting possible failures in the technical applications.

It can be envisaged that the method executes in the same time slot, without time segregation, a technical application with several levels of criticality.

When one of the technical applications calls upon the services of the basic software of the computer, the process according to the invention temporarily interrupts the computer and updates the entitlements of the current technical application, this update corresponding to the entitlements of the basic software applied to the technical application, the basic software possessing a level of criticality higher than or equal to the highest level of all the technical applications processed by the computer.

The present invention also relates to a device for processing several computer-controlled technical applications which comprises:

means for defining work time cycles within the same computer generating cycle interrupts, means for defining, during these work time cycles, time slots of fixed duration, which are allotted to the technical applications, and for generating at the end of a time slot allotted to an application, a start interrupt for starting another application, means for allotting each application at least one memory space slot write-protected in relation to the other applications.

BRIEF DESCRIPTION OF THE DRAWINGS

The present invention will be better understood on reading the detailed description of non-limiting examples which is illustrated by the appended drawings which represent.

DETAILED DESCRIPTION OF THE PREFERRED EMBODIMENTS

Figure 1:
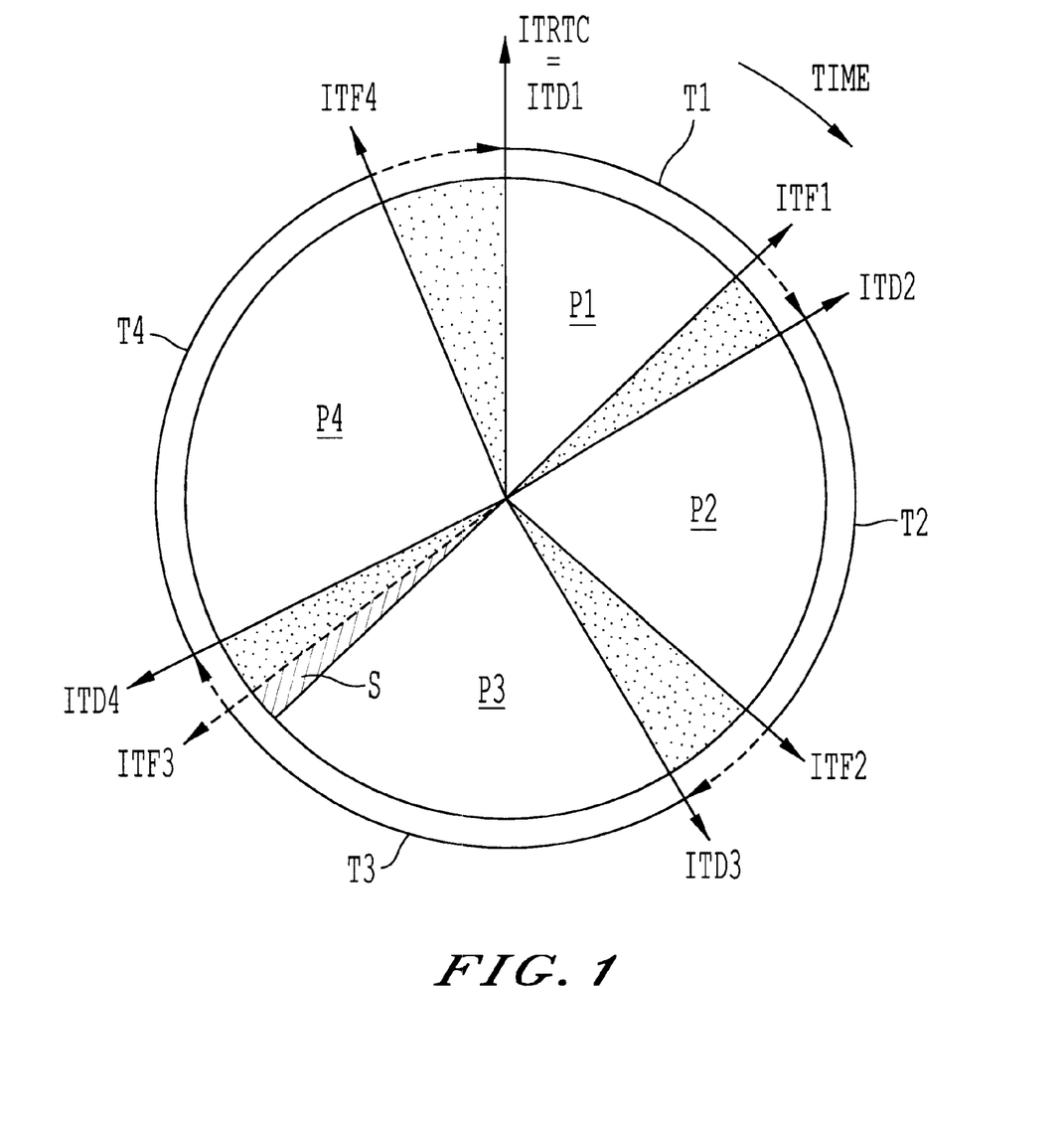
FIG. 1: an example of a work time cycle which allows the processing of the applications according to the method of the invention.

The single computer which allows the processing of the various technical applications labelled P1, P2, P3, P4 in FIG. 1, operates with basic software whose level of criticality is at least equal to the highest level of criticality of the technical applications to be processed. The basic software is common and each technical application uses the resources of the basic software.

The method of processing according to the invention consists in carrying out a slicing of the work time and of the memory space of the computer so as to allot slots thereof to the various technical applications.

The work time of the computer is divided into successive cycles whose duration is, for example, of the order of 50 milliseconds. FIG. 1 shows one of these cycles diagrammatically. The successive cycles are obtained by interrupts ITRTC of the work time of the computer.

The method according to the invention consists in allotting at least one time slot T1, T2, T3, T4 of previously fixed duration to the technical applications P1, P2, P3, P4 during these work cycles. During the time slot allotted to it the technical application will execute and at the end of this time slot is interrupted so that the next technical application can start.

For example, at the end of time slot T2 assigned to technical application P2, a start interrupt ITD3 is generated, it instructs the starting of the next technical application P3. This next technical application P3 starts safely at a fixed instant in the cycle which corresponds to the end of slot T2 so that the duration of time slot T3 which is assigned to technical application P3 is not modified. While the computer is operating, a start interrupt ITD causes the computer to divert to another technical application with a view to its processing. The start interrupts are referenced ITD1, ITD2, ITD3, ITD4.

During the execution of a technical application, the basic software can perform "atomic sections", these being steps which cannot be interrupted. For example, the reading of data from a buffer may not be interrupted since after an interrupt, if the reading of such data is continued in the next cycle, the data might have been modified.

To avoid this, provision may be made to precede a start interrupt ITD with an end interrupt ITF which interrupts the current technical application, unless an atomic section is currently being executed. The technical application in question will then be interrupted only at the end of the atomic section. This end interrupt ITF can be temporarily masked by the basic software since it is only active in certain cases, when it arrives in the absence of any step which may not be interrupted. The end interrupts are referenced ITF1, ITF2, ITF3, ITF4.

A start interrupt has a higher level of priority than that of the end interrupts, thus enabling the start interrupts to be made non-masking in relation to the atomic sections.

If for one reason or another the processing of a technical application takes more time than that allotted to it, the start interrupt guarantees the next technical application an intact time slot.

The time interval between an end interrupt IF and the start interrupt ITD which follows it is greater than or equal to the longest duration of the atomic sections of the basic software. This time interval is, for example, of the order of 500 μs.

In FIG. 1, it has been assumed that an atomic section S was running at the time of the end interrupt ITF3. The latter is then actionless and the atomic section S continues to run. The interrupt ITD4 which occurs later when the atomic section has terminated, marks the start of the execution of the next technical application P4.

In the example represented it has been assumed that the cycle interrupt ITRTC coincided with the start interrupt ITD1 of the first technical application P1 but this is not obligatory.

It would be conceivable for the cycle interrupt ITRTC to coincide with the end interrupt ITF4 of the last technical application P4 or else for it to arrive between the end interrupt ITF4 of the last technical application P4 and the start interrupt ITD1 of the first P1.

The position of the cycle interrupts ITRTC, of the start ITD and end ITF interrupts are programmable, preferably with a resolution of at least 50 microseconds.

An end interrupt ITF causes the basic software to change the current technical application. In the example described, this change corresponds to the incrementing of the rank of the current application, since the successive applications have increasing ranks. This incrementation serves for the spatial slicing which will be explained below.

Figure 2:
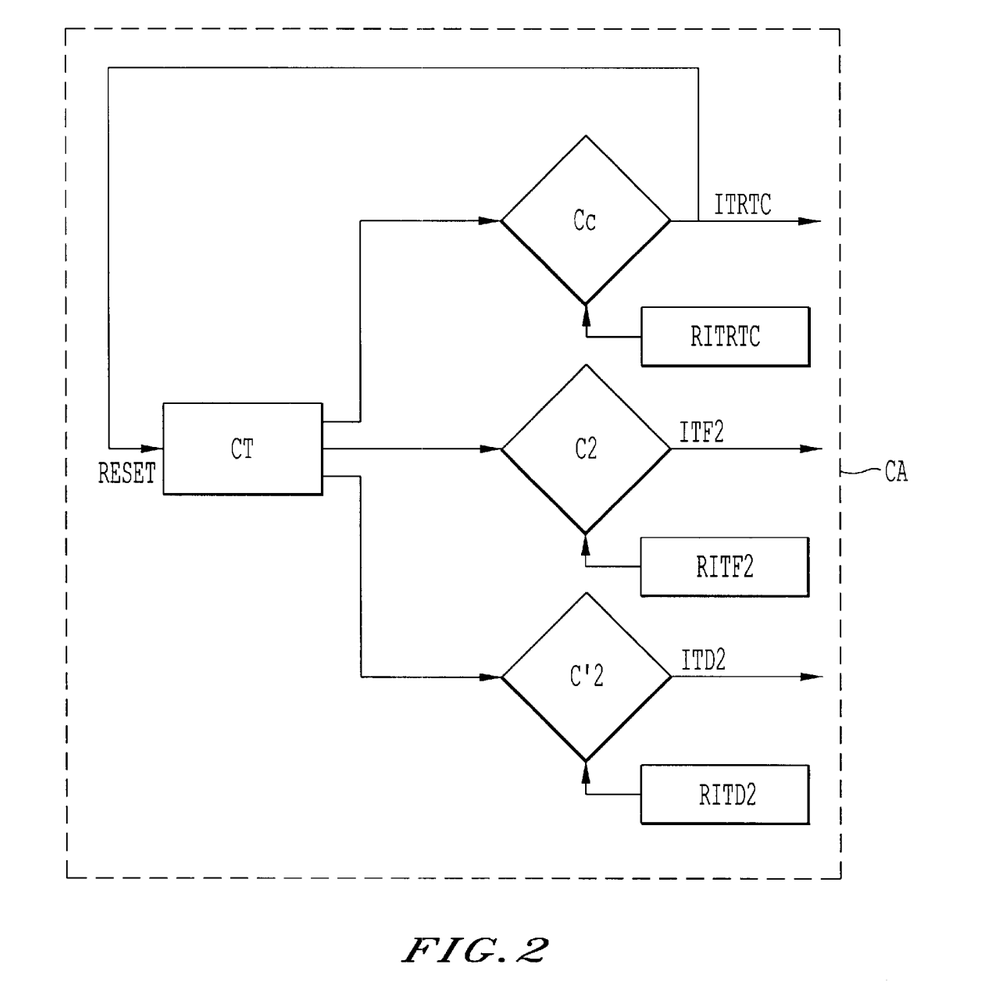
FIG. 2: an example of the means for carrying out the temporal slicing of the method in accordance with the invention.

Reference is made to FIG. 2 which shows partially a device for processing several technical applications within the same computer CA. This device makes it possible to carry out a spatial slicing of the work time of the computer CA. This device comprises means for defining work time cycles of the computer CA. These means may be formed by a time counter CT, a cycle duration register RITRTC and an equality comparator Cc. The time counter CT can for example be regulated by the basic clock of the computer CA divided by 80. The equality comparator Cc compares the value of the duration counter CT with that of the cycle duration register RITRTC and in case of equality generates a cycle interrupt ITRTC and resets the time counter CT to zero.

The device also comprises means for defining, during the work time cycles, the time slots allotted to the technical applications and which generate, at the end of a time slot, the start interrupt ITD. These means can comprise for each technical application processed during a time slot (in FIG. 2 the means used for application P2 of rank 2 have been represented), a start duration register RITD2 and an equality comparator C'2 and call upon the duration counter CT. The start duration register RITD2 makes it possible to define the duration between the resetting to zero of the time counter CT and the start of the next technical application. The equality comparator C'2 compares the value of the duration counter CT with that of the start duration register RITD2 and in case of equality generates a start interrupt ITD2.

The device can furthermore comprise means for generating, during a time slot, the end interrupt ITF. These means may comprise an end duration register RITF2 and an equality comparator C2 and call upon the duration counter CT. The end duration register RITF 2 makes it possible to define the duration between the resetting to zero of the time counter CT and the end of the current application. The equality comparator C2 compares the value of the duration counter CT with that of the end duration register RITF2 and in case of equality generates an end interrupt ITF2.

All these interrupts are managed by software called SLICER which is included in the basic software. Two duration registers are used per time slot in a cycle.

If the running of one of the technical applications P1, for example, is abnormal, the running of the next technical application P2 is not disturbed.

Figure 3A:
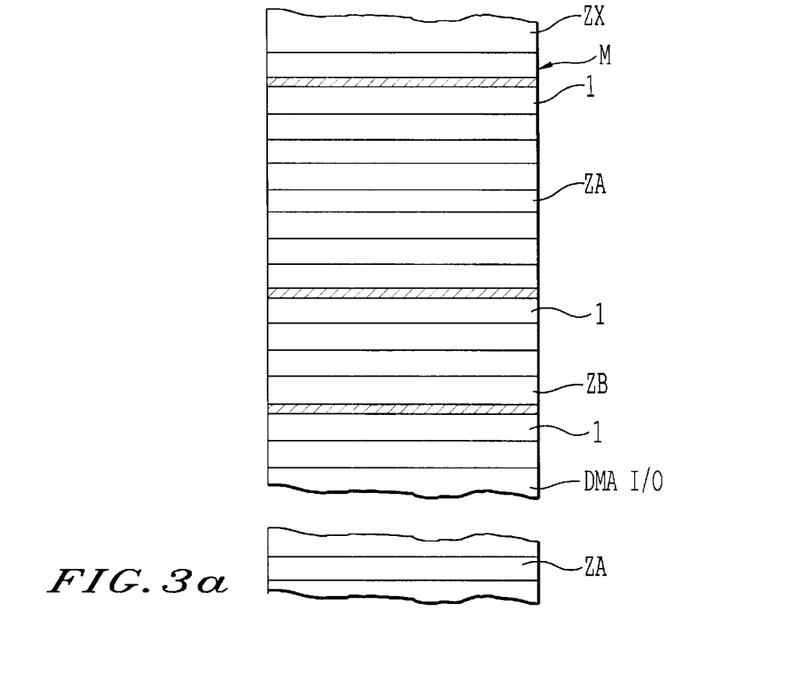
FIG. 3a: the structure of the memory of the computer used for the processing of the applications in the method of the invention.

Reference is made to FIG. 3a. The addressable field M of the computer comprises several areas ZA, ZB, DMA I/O, ZX sliced into memory space slots 1. Certain areas such as the data areas ZA, ZB are dedicated to a single technical application and are write-accessible to this technical application and to the basic software, others, such as the specific area DMA I/O, are dedicated to one or more hardware devices described later, and are write-accessible to the basic software and are write-protected in relation to the technical applications, still others ZX may be freely accessed by all the agents able to write. Certain areas correspond to true memories others to fields of addresses used to talk to the hardware devices other than memories.

According to the method of the invention, certain memory space slots are dedicated to a technical application and these space slots are protected, that is to say write-inaccessible to the other technical applications hosted on the same computer.

Figure 3B:
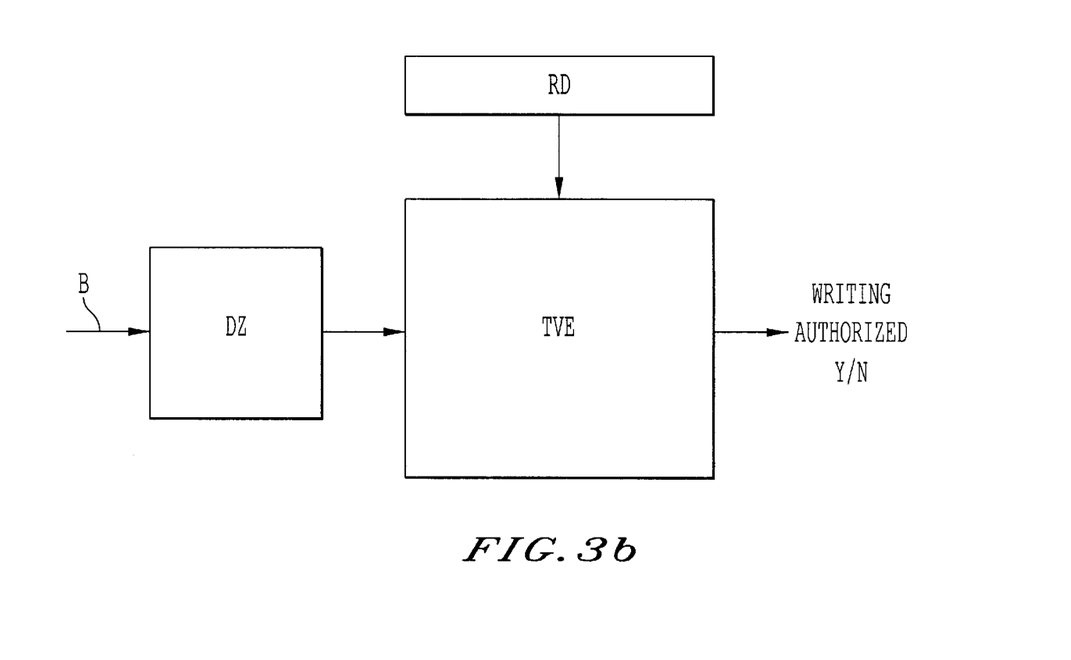
FIG. 3b: an example of the means for carrying out the spatial slicing of the method in accordance with the invention.

Reference is made to FIG. 3b which shows means making it possible to carry out a spatial slicing of the addressable field M and hence to allot each technical application at least one memory space slot which is write-protected in relation to the other technical applications. These means comprise an entitlements register RD which makes it possible to ascertain the entitlements of the current technical application, an area detector DZ which determines the assignment of the memory space slot accessed by the computer and a write truth table TVE which indicates whether access is or is not authorized.

The entitlements register RD is freely read-accessible. It serves as first input (columns) to the truth table TVE. It is kept up-to-date by the basic software and by it alone as seen earlier.

The entitlements of a technical application are determined in particular as a function of each level of criticality at the time of writing to the entitlements register RD. It will be seen subsequently that in a time slot a technical application may have several levels of criticality.

The area detector DZ makes it possible to ascertain which assignment pertains to the memory space slot accessed. It may be carried out by a downloadable EPROM flash memory. This memory can contain for each space slot, on several bits, in particular the type of memory area, the rank of the application assigned to it, the level of criticality, possibly a private bit which indicates when it is active, for example at 1, that the space slot is read-confidential in relation to the other technical applications and that it can only be read by the technical application of the same rank. When the private bit is inactive, for example at 0, this signifies that the space slot is not read-confidential as will be seen subsequently.

Advantageously, all these areas may be formed of several disjoint blocks. FIG. 3a shows the area ZA comprising at least two disjoint blocks. An embodiment based on a read-only memory allows great flexibility in the construction of the areas with disjoint blocks. The size of the read-only memory makes it possible to determine the granularity of the areas.

The area detector DZ is linked by a bus B to the microprocessor of the computer (not represented) which scans all the memory space slots. The area detector serves as second input (rows) to the truth table TVE. A write-violation interrupt prohibiting writing is activated when a technical application write-accesses a memory space slot in respect of which it has no entitlements.

Each technical application is associated with one or more entities to which it is intended to send data. The method according to the invention also makes it possible to protect these entities.

Figure 4A:
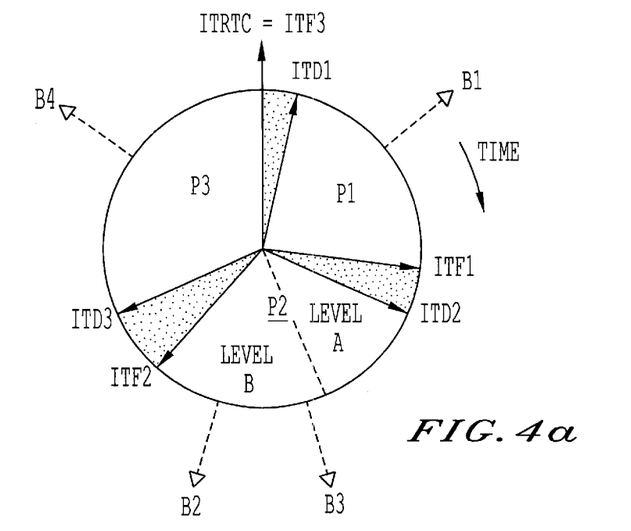
FIG. 4a: another example of a work time cycle which allows the processing of the applications according to the method of the invention.
Figure 4B:
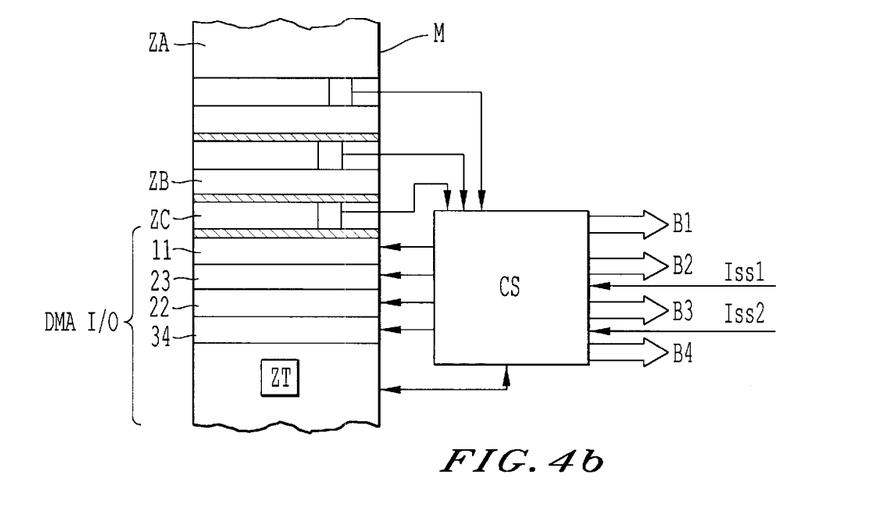
FIG. 4b: the means of processing the data bound for the outputs associated with the applications processed by the method according to the invention.

Reference is made to FIGS. 4a, 4b which respectively represent a processing cycle of the computer and partially the addressable field M of the computer with the specific area DMA I/O sliced into memory space slots and the data areas ZA, ZB, ZC dedicated to the technical applications. At least one hardware device CS for accessing the addressable field M observes the writing of the data to the space slots dedicated to the technical applications and it can sample them at the time they are written. It routes them via communication buses B1, B2, B3, B4, for example of ARINC 429 type to the appropriate entity (not represented). The entities correspond, for example, to the control surfaces for the automatic pilot application or else to the magnetic medium of the flight recorder for the data concentration application in respect of the flight recorder.

For example, it is assumed that the technical application P1 can send data over the bus B1 and that it is associated with the area ZA, that the technical application P2 can send data over the buses B3, B2 and that it is associated with the area ZB and that the technical application P3 can send data over the bus B4 and that it is associated with the area ZC.

The hardware device CS for accessing the addressable field may possibly utilize a buffer memory area ZT in the specific space area DMA I/O so as to temporarily store the data before transmitting them.

Each time a technical application wishes to send data to an entity, the data can only be written to the appropriate space slot and this authorization to write is given by the truth table TVE. With this system of protection the data concentration system for the flight recorder may not send data to the control surfaces.

At least one hardware device CS can receive information originating from the entities, via serial links Is1, Is2. The hardware device CS writes them to slots 11, 23, 22, 34 of the specific area DMA I/O where they are read-available for one or more technical applications. The read-protection is described subsequently. In FIG. 4b, a single hardware device CS has been represented for transmission and for reception, but several of them may be provided operating in one or both directions.

During a given time slot, a technical application can be executed, this corresponding to various tasks of various levels of criticality. For example, during this time slot computational tasks will be performed followed later by comparison test tasks. The computations generally require a higher level than the comparison tests. It will not be possible to write the data from the tests to the space slot reserved for the computations. We always go from the highest level to the lowest level so as to prevent the lowest level from disturbing the highest. Time segregation is always present in relation to the next technical application. FIG. 4a shows a work cycle in which the application P2 is of level A in a first part of the time slot which is allotted to it and of level B in a second part.

Figure 5:
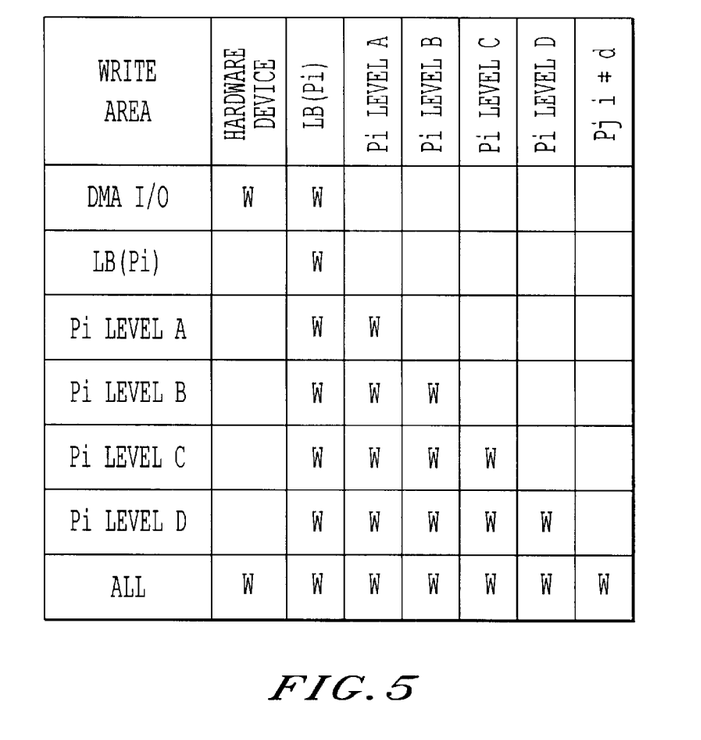
FIG. 5: an example of the truth table used for the spatial slicing.

FIG. 5 shows an example of a write truth table TVE. The rows represent various areas of the addressable field: specific area DMA I/O dedicated to the hardware devices, area reserved for the basic software LB mandated by the technical application Pi, area reserved for the technical application Pi of level A, area reserved for the technical application Pi of level B, area reserved for the technical application Pi of level C, area reserved for the technical application Pi of level D, area reserved for all the agents able to write. The columns represent the various agents able to write to these areas, namely the hardware device CS, the basic software mandated by the technical application Pi of any level, the technical application Pi of level A, the technical application Pi of level B, the technical application Pi of level C, the technical application Pi of level D, the technical application Pj (j different from i) or the basic software mandated by the technical application Pj. The letter W at the intersection of a row and a column is a write authorization. When there is nothing at the intersection of a row and a column this is because writing is prohibited.

Figure 6:
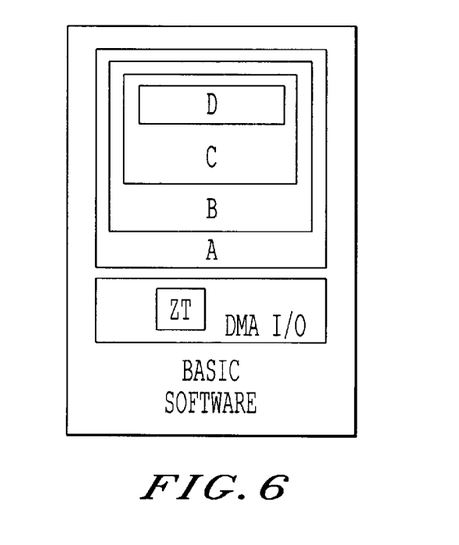
FIG. 6: the nesting of the memory areas of the computer used in the method of processing according to the invention.

FIG. 6 shows the nesting of the areas including those corresponding to the various levels of the technical applications, to the basic software, the specific area DMA I/O encompassing the buffer area ZT.

During the execution of a technical application of a given level of criticality, it may be expedient to request the services of the basic software LB of higher level.

Each call to the basic software is made with the aid of a prompt register. The writing of the rank of the current technical application to this register causes a temporary interrupt ITSVC of the computer and an update of the entitlements register RD is performed automatically during the interrupt. These two operations are inseparable. The update corresponds to the changing of the entitlements of the current technical application with those of the basic software applied to the technical application which called it.

Figure 7:
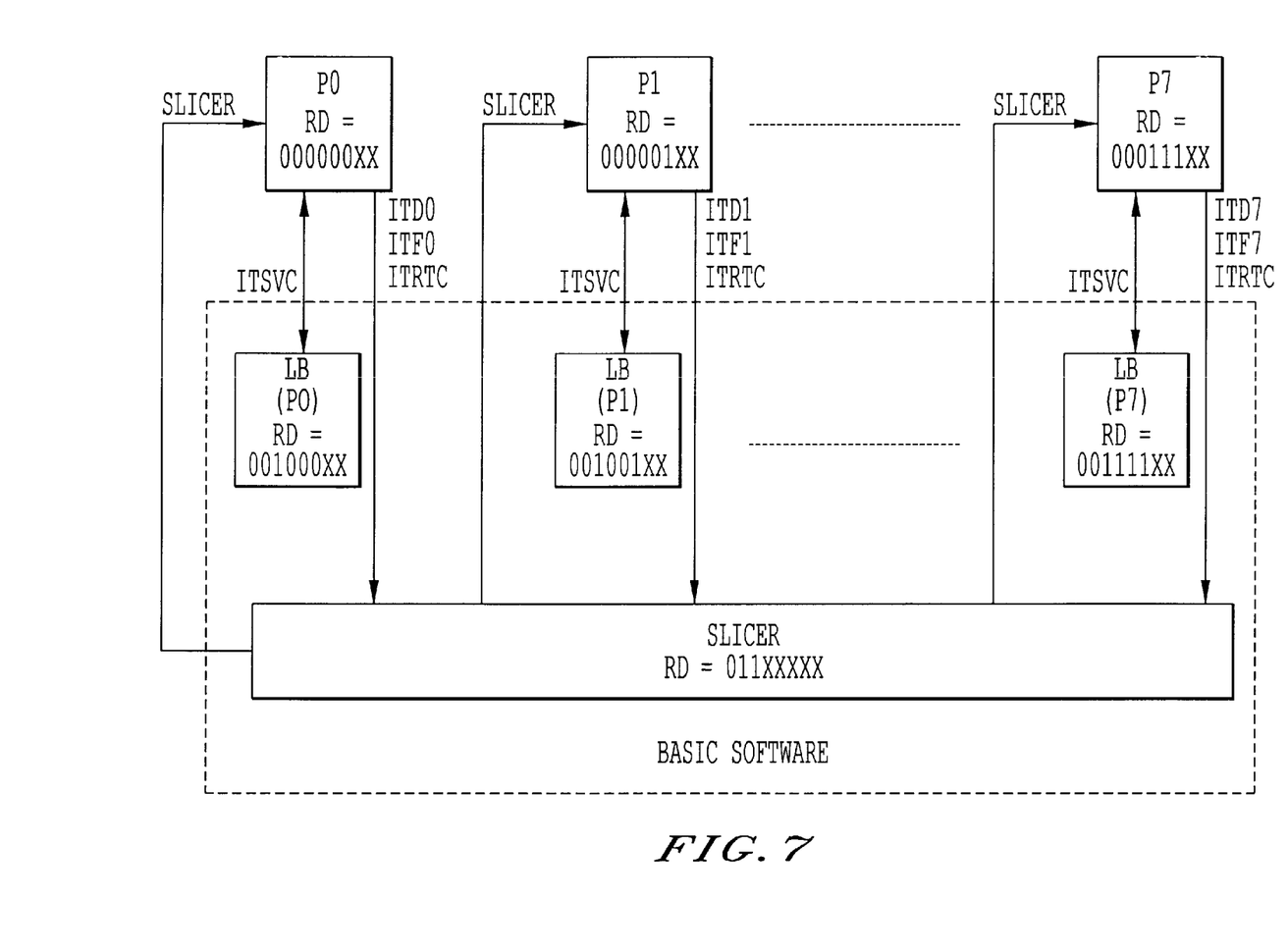
FIG. 7: a partial example of the processing device in accordance with the invention.

FIG. 7 shows a partial example of a device for processing several technical applications in accordance with the invention. The various applications are referenced P0 to P7. Their code in the entitlements register RD is mentioned for each of them. In the course of its processing, a call to the basic software LB causes an interrupt ITSVC and a change of the entitlements in the entitlements register. The generation of other interrupts ITRTC, ITF, ITD and the role of the SLICER software were described earlier.

Figure 8A:
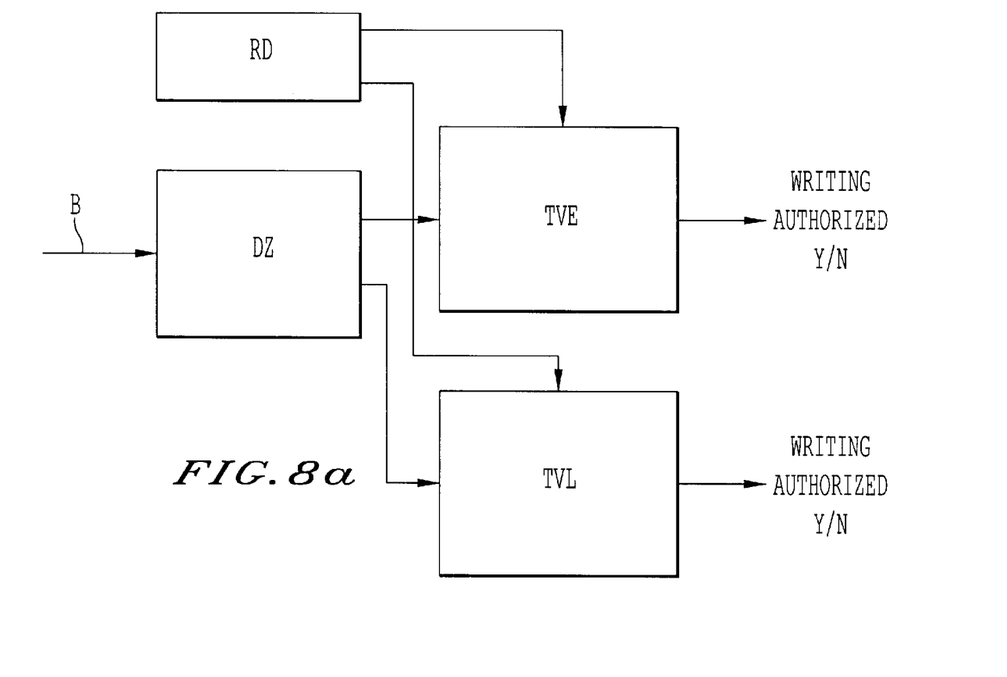
FIG. 8a: an example of the means for carrying out the spatial slicing of the method according to the invention, ensuring read-protection.
Figure 8B:
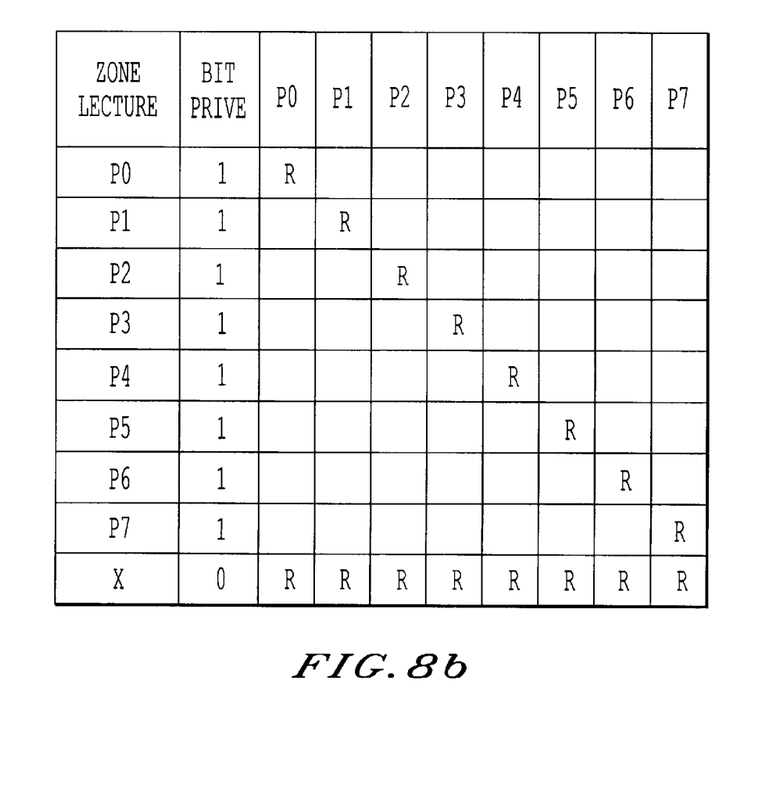
FIG. 8b: an example of a truth table used for read-protection.

In addition to the write-protection of the various areas of the addressable field of the computer, the processing method according to the invention may provide read-protection. FIG. 8a supplements FIG. 3b and shows the means making it possible to carry out a spatial slicing of the addressable field M of the computer with write- and read-protection of the various memory space slots. The entitlements register RD, the area detector DZ and a read truth table TVL are used to achieve this protection. It was seen when describing the area detector DZ that the latter could comprise for each accessed memory slot a private bit indicating, for example, whether the memory space slot accessed is read-confidential in relation to the other applications. FIG. 8b is an example of a read truth table TVL. The rows represent various areas of the addressable field, the columns various applications. The entitlements register RD feeds the columns and the area detector DZ the rows. Encountered first are the areas corresponding to the technical applications P0 to P7. These areas have a private bit equal to 1, this signifying read-prohibition by the technical applications of different rank. An arbitrary area referenced X corresponding to all the areas for which the private bit is not active (in the example equal to 0) can be read by all the technical applications P0 to P7. This area is used to store, for example, data received from entities by the hardware devices and which can be used by several technical applications or data produced by a technical application and which are made available to one or more others. An R at the intersection of a row and a column indicates a read authorization. When there is nothing at the intersection of a row and a column it is because reading is prohibited. A read-violation interrupt is activated when a technical application read-accesses a memory space slot in respect of which it has no entitlements.

We claim:

1. Method of processing several computer-controlled technical applications comprising the steps consisting in:

executing all the technical applications within the same computer working in successive work cycles by allotting thereto, during these work cycles, at least one time slot of previously fixed duration, generating at the end of time slot allotted to a technical application a start interrupt aimed at starting the execution of another technical application, allotting to each technical application at least one memory space slot for writing data, this memory space slot being write-inaccessible to the other technical applications, characterized in that it comprises a step consisting in:

generating previously, during the time slot, an end interrupt intended to interrupt the current application unless an uninterruptible step, termed an atomic section, is currently being executed, the time interval between the end interrupt and the following start interrupt being at least equal to the longest duration of the atomic sections, so that a technical application which during execution possesses a given level of criticality does not disturb another technical application having a higher or equal level of criticality.

2. Method of processing several technical applications according to claim 1, characterized in that it allocates entitlements to the current technical application and, before writing data relating to the technical application currently executing into a memory space slot, checks whether this memory space slot corresponds to the entitlements possessed by the technical application being executed, the entitlements of the said technical application being in particular dependent on its level of criticality.

3. Method of processing several technical applications according to claim 2, in which certain data relating to a technical application are routed to at least one entity associated with the technical application, characterized in that it sends them from the memory space slot via a communication bus to the associated entity, possibly causing them to travel through a buffer memory area.

4. Method of processing several technical applications according to claim 2, characterized in that it generates a write-violation interrupt, with prohibition of writing, when a technical application write-accesses a memory space slot in respect of which it is without entitlements.

5. Method of processing several technical applications according to claim 2, characterized in that it, before reading data relating to the technical application currently executing from a memory space slot, checks whether this memory space slot corresponds to the entitlements possessed by the technical application currently being executed.

6. Method of processing several technical applications according to claim 5, characterized in that it generates a read-violation interrupt when a technical application read-accesses a memory space slot in respect of which it is without entitlements.

7. Method of processing several technical applications according to claim 1, characterized in that it executes in the same time slot, without time segregation, a technical application with several levels of criticality.

8. Method of processing several technical applications according to claim 1, characterized in that, when one of the technical applications calls upon the services of the basic software of the computer, it temporarily interrupts the computer and updates the entitlements of the current technical application, this update corresponding to the entitlements of the basic software applied to the technical application, the basic software possessing a level of criticality higher than or equal to the highest level of all the technical applications processed by the computer.

9. Device for processing several computer-controlled technical applications comprising:

means for defining work time cycles within the same computer generating cycle interrupts, means for defining, during these work time cycles, time slots of fixed duration, which are allotted to the technical applications, and for generating at the end of a time slot allotted to an application, a start interrupt for starting another application, means for allotting each application at least one memory space slot write-protected in relation to the other applications, characterized in that it furthermore comprises means for generating, during the time slot, allotted to the application an end interrupt (ITF1, ITF2) intended to interrupt the current technical application unless an uninterruptible step, termed an atomic section, is running.

10. Device for processing several computer-controlled technical applications, according to claim 9, characterized in that the means for defining the work time cycles comprise a time counter, a cycle duration register, an equality comparator which compares the value of the time counter to that of the duration register, which generates the cycle interrupt in case of equality and which resets the time counter to zero.

11. Device for processing several computer-controlled technical applications, according to claim 9, characterized in that the means for defining each time slot comprise a time counter, a duration register, an equality comparator which compares the value of the time counter with that of the duration register and which generates the start interrupt in case of equality.

12. Device for processing several computer-controlled technical applications, according to claim 9, characterized in that the means for generating an end interrupt comprise a time counter, a duration register, an equality comparator which compares the value of the time counter with that of the duration register and which generates the end interrupt in case of equality.

13. Device for processing several computer-controlled technical applications, according to claim 9, characterized in that the means for allotting each application at least one memory space slot comprise an entitlements register containing the entitlements of the current technical application, an area detector containing the assignment of the memory space slot and a write truth table, one of whose inputs is embodied by the area detector and the other by the entitlements register and which indicates whether or not writing is authorized.

14. Device for processing several computer-controlled technical applications, according to claim 13, characterized in that the means for allotting each technical application at least one memory space slot comprise a read truth table, one of whose inputs is embodied by the area detector and the other by the entitlements register and which indicates whether the reading of a memory space slot is or is not authorized to a technical application.

15. Method of processing several technical applications according to claim 3, characterized in that it generates a write-violation interrupt, with prohibition of writing, when a technical application write-accesses a memory space slot in respect of which it is without entitlements.

16. Method of processing several technical applications according to claim 3, characterized in that it, before reading data relating to the technical application currently executing from a memory space slot, checks whether this memory space slot corresponds to the entitlements possessed by the technical application currently being executed.

17. Method of processing several technical applications according to claim 2, characterized in that it executes in the same time slot, without time segregation, a technical application with several levels of criticality.

18. Method of processing several technical applications according to claim 3, characterized in that it executes in the same time slot, without time segregation, a technical application with several levels of criticality.

19. Method of processing several technical applications according to claim 4, characterized in that it executes in the same time slot, without time segregation, a technical application with several levels of criticality.

20. Method of processing several technical applications according to claim 5, characterized in that it executes in the same time slot, without time segregation, a technical application with several levels of criticality.

* * * * *